United States Patent [19]
Fischer

[11] 3,749,319
[45] July 31, 1973

[54] APPARATUS FOR SPRAYING PLANTS

[76] Inventor: Adolf Fischer, 43 Speyerer Strasse, Mutterstadt, Germany

[22] Filed: Oct. 27, 1971

[21] Appl. No.: 193,116

[30] Foreign Application Priority Data
Nov. 4, 1970 Germany............ P 20 54 222.7

[52] U.S. Cl.................. 239/318, 47/48.5, 239/346
[51] Int. Cl................................ A62c 5/02
[58] Field of Search............... 239/143, 318, 346, 239/398; 222/193, 195; 47/38, 27, 48.5, 1.2

[56] References Cited
UNITED STATES PATENTS

| | | | |
|---|---|---|---|
| 3,119,562 | 1/1964 | Tyler | 239/318 |
| 3,669,357 | 6/1972 | Overbey | 239/318 X |
| 3,623,910 | 11/1971 | Calhoun et al. | 134/186 X |
| 3,550,854 | 12/1970 | Fischer | 239/143 X |
| 3,168,797 | 2/1965 | Patassy | 47/38 |
| 2,928,211 | 3/1960 | Martin | 47/1.2 |
| 3,616,560 | 11/1971 | Mun | 47/1.2 |
| 3,680,784 | 8/1972 | Fakes | 239/126 |

FOREIGN PATENTS OR APPLICATIONS

| | | | |
|---|---|---|---|
| 142,033 | 8/1930 | Switzerland | 239/318 |

Primary Examiner—M. Henson Wood, Jr.
Assistant Examiner—Michael Mar
Attorney—Johnston et al.

[57] ABSTRACT

Apparatus for spraying plants having a liquid reservoir, suction tube and fixed overflow.

9 Claims, 4 Drawing Figures

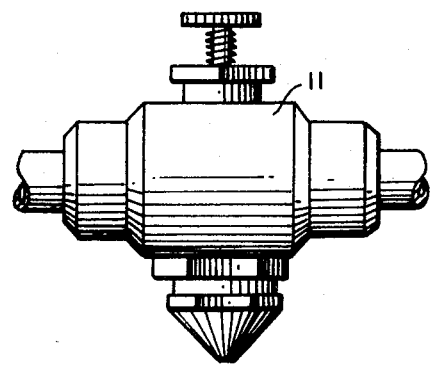
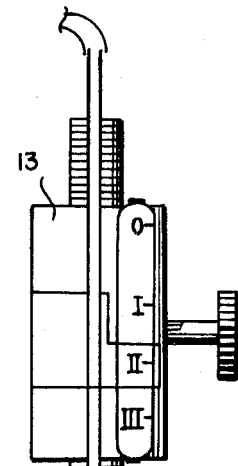
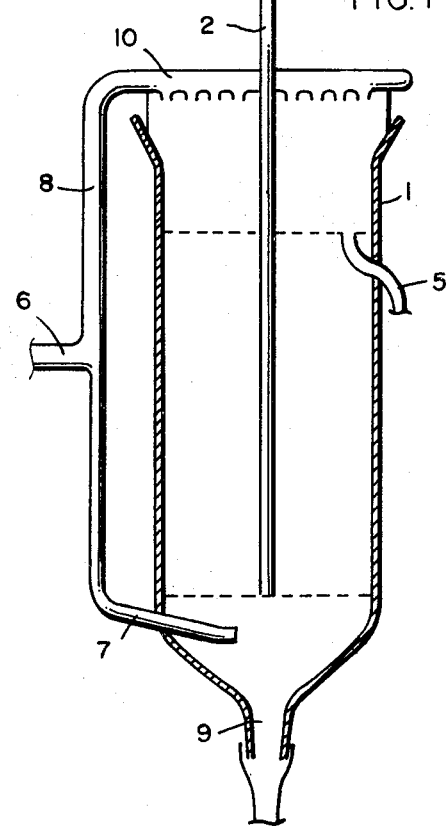
FIG. 2
FIG. 1

APPARATUS FOR SPRAYING PLANTS

The present invention relates to an apparatus for spraying plants, in which the spray liquor is sucked in a predetermined amount from a reservoir and sprayed by means of air.

When using plant protection agents in the form of spray liquids, it is necessary to wet the plants uniformly with the spray liquor. This is of particular importance when testing new plant protection agents, as results may be inaccurate as a consequence of non-uniform treatment. Wetting is expediently carried out by spraying the plants with the spray mixture.

Numerous apparatuses are known for spraying plants, e. g., glass atomizers, spray guns or cabinets or equipment with superatmospheric or subatmospheric spray systems, where the spray liquid is sucked up in a predetermined amount and atomized by means of an air stream. The disadvantage of all these apparatuses, however, is that it takes considerable time to spray a large number of plants and even longer to clean the equipment or nozzles when the spray liquor is changed. A further disadvantage is that when the spray mixture is changed there exists a danger that active ingredient may be carried over, thus falsifying the results. The known apparatuses are therefore unsatisfactory.

The numbers in brackets in the following relate to the accompanying drawings wherein:

FIG. 1 is a side elevation, partly in cross-section, of a first embodiment of a liquid reservoir with a single, height adjustable suction tube.

FIG. 2 is a side elevation of an injector nozzle used therewith;

Figure 3:
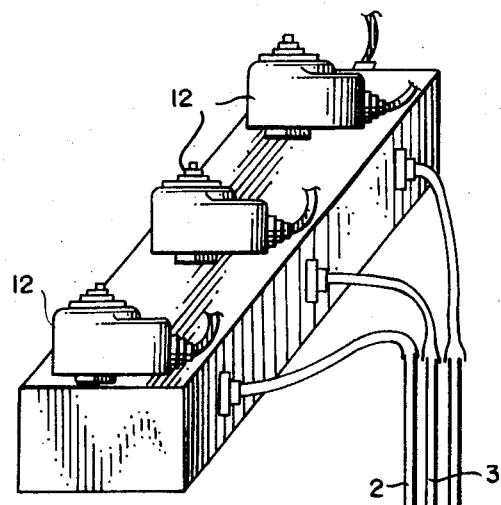
FIG. 3 is a side elevation, partly in cross-section, of a second embodiment of a liquid reservoir with three suction tubes, together with electromagnetic valves for the suction tubes.
Figure 3:
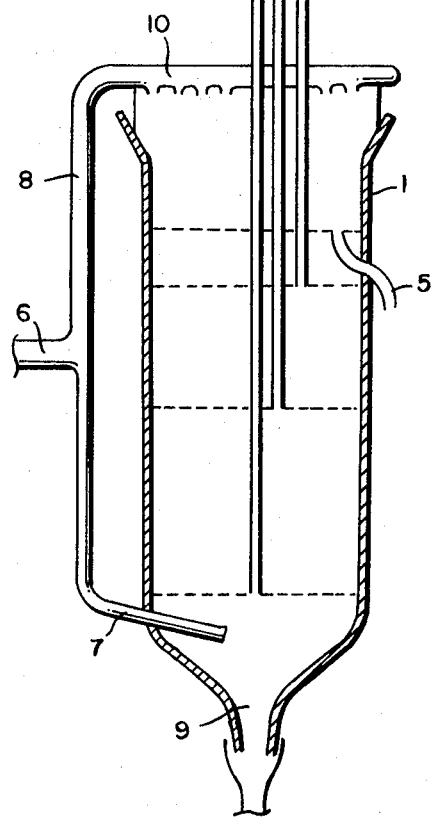
Figure 4:
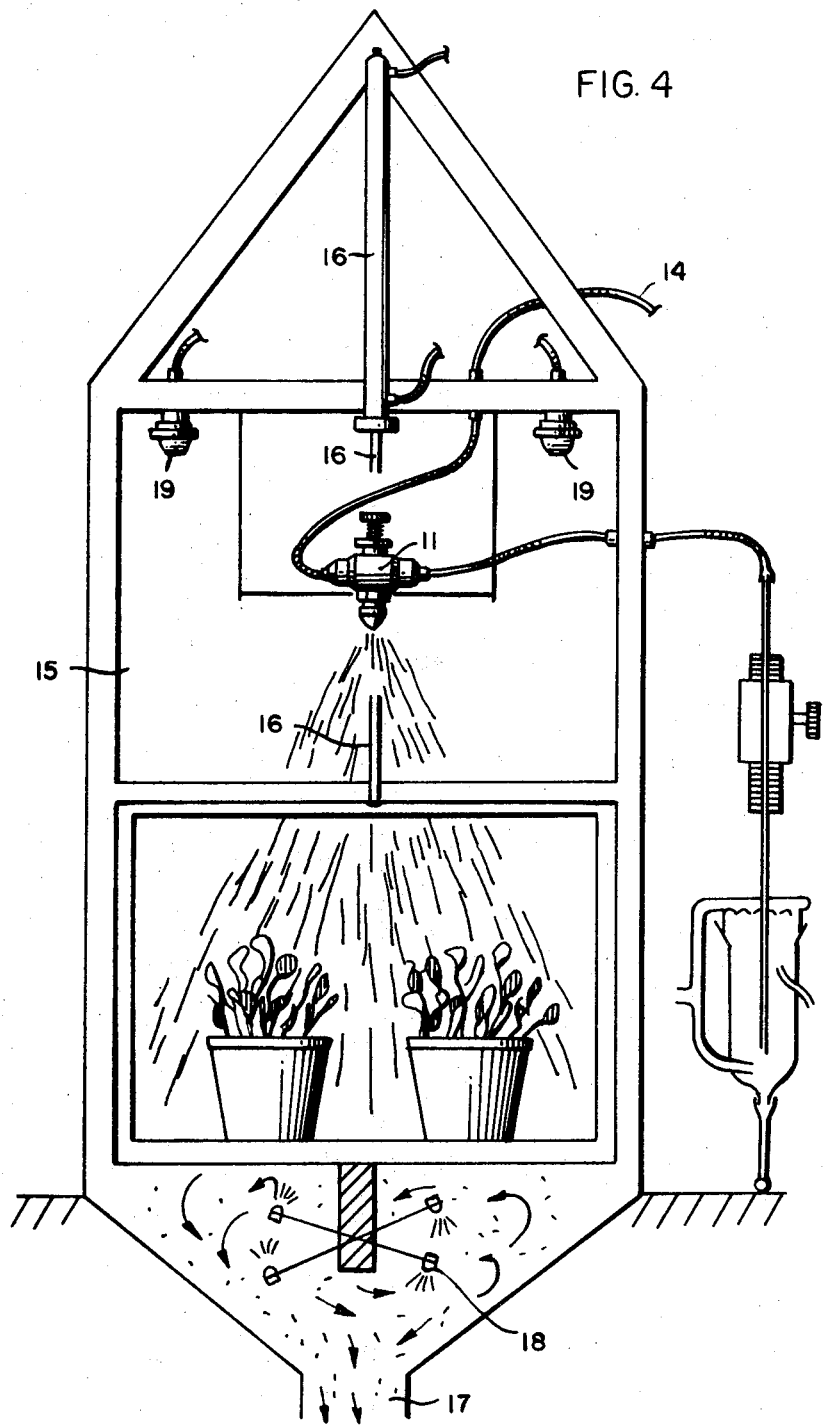
FIG. 4 is a side view of a cabinet for plants with the spray device of FIG. 1 in use therewith.

We have now found that an apparatus for spraying plants, in particular a large number of plants, in a short period of time and with many different active ingredients, the spray liquor being sucked up in a predetermined amount and atomized by means of an air stream, does not have the above disadvantages when it is equipped with a liquid reservoir 1 having one or more suction tubes 2 to 4 whose height is adjustable and a fixed overflow 5. Reservoir 1 may be of any material, e. g., plastics, for instance polystyrene, polyacrylic compounds or polyethylene. The reservoir is preferably of glass. The level of the spray liquor in the reservoir 1 is determined by an overflow 5.

The spray liquor is filled into the reservoir until excess liquor escapes via the overflow.

The amount of spray liquor to be used for each spraying operation is determined by adjusting the immersion depth of the ends of the suction tubes 2 to 4. The depths of the various tubes may, for example, be fixed or altered mechanically by means of a rack-and-pinion drive 13.

The apparatus according to the invention is advantageously provided with lines 6 to 9 for the supply and withdrawal of flushing agent, in order to flush the apparatus as effectively and quickly as possible between liquor changes. After having been cleaned, the reservoir can be substantially dried by passing in air, preferably hot air.

The spray mixtures used in practice are frequently dispersions of solids of fine particle size in a liquid. Sediment is often formed on standing, and it is therefore advisable to stir the spray liquor in the reservoir between spraying operations. The reservoir is therefore advantageously equipped with air-injection stirring means 7. To simplify the whole spraying procedure, the stirring means may be switched automatically on upon completion of spraying and off on recommencement of spraying.

To facilitate rapid and complete cleaning of the reservoir, an arm 7 of flushing agent supply line 6 enters the lower portion of the reservoir and a further arm 8 communicates with a ring of nozzles 10 which are arranged above the reservoir which is open at the top.

For the spray liquor to be finely dispersed over the plants it is expedient for the suction tube or tubes 2 to 4 to be connected with an injector nozzle 11. By injector nozzle we mean a nozzle which is provided with a compressed air supply line 14 and in which, with the aid of the compressed air, the liquid is atomized. More liquid is automatically supplied to the nozzle during atomization. By spray liquor we mean a solution or dispersion containing a chemical compound in water or an organic solvent. The spray liquor may additionally contain conventional wetting agents, dispersing agents, emulsifiers, solubilizers or antifoam agents.

By automatic suction we mean that the spray liquor is sucked up during operation of the injector nozzzle in the amount necessary for achieving uniform distribution of the liquor. The reservoir and its contents are at atmospheric pressure. The contents of the reservoir are sucked up through the suction tube or tubes by the injector nozzle and are therefore not forced there by superatmospheric pressure.

As large amounts of liquid have to be disposed off when the apparatus according to the invention is cleaned, it is expedient for an outlet 9 at the bottom of the reservoir and the nozzle 11 to be the lines for disposal of the flushing agent. This ensures that not only the reservoir but also the suction tubes 2 to 4, the lines leading to the injector nozzle and the nozzle itself are flushed.

If there is more than one suction tube it is advantageous for magnetic valves 12 to be located between the suction tubes 2 to 4 and the nozzle 11 so that the various tubes may be switched on and off.

It is also possible during the spraying operation to allow water or another liquid to flow continuously into the reservoir in order to achieve continuous dilution ("logarithmic" spraying) of the spray liquor (reduction in active ingredient concentration in the liquor).

The apparatus according to the invention may be used as stationary equipment, e. g., in a greenhouse, or as mobile equipment, e. g., mounted on a vehicle such as a tractor or hitch. In the case of mobile equipment, a windshield suitable for protecting the plots to be sprayed may be easily attached. Whatever method is employed, the plants are sprayed quickly, accurately and substantially automatically.

It the apparatus according to the invention is used as stationary equipment, the plants are advantageously sprayed in a spray cabinet 15. The mist and vapors formed may be removed or suctioned off either upward by means of a ventilator or preferably downwards, when the cabinet is opened.

Downward removal and dilution of the mist and vapors can be simply effected for example by producing, below the cabinet, a vortex after spraying is over and shortly before the cabinet is opened by means 16. The mist and vapors, together with the water, may be introduced into the sewer system, if desired after passing through a filter to hold back solids or injurious vapors. To introduce the vapors more quickly into the sewer system a ventilator may be provided.

This vortex may be produced for instance by rotating water jets 18 or by fixed nozzzles arranged tangentially round a funnel-shaped opening.

The determining factor for the amount of liquor to be sprayed per operation is the height difference between the fixed overflow 5 and the bottom of the tube or tubes 2 to 4 in the liquor. The deeper the tubes are immersed in the liquor, the more liquor is used for each spraying operation, as each operation is only finished when no more liquor reaches injector nozzle 11. When a number of sprayings have to be carried out with only one spray liquor, the operating cycle comprising filling the liquor into the reservoir, automatic adjustment of the upper liquid level, suction of the liquor until only air is sucked up, completion of spraying, and renewing filling of liquor into the reservoir enables rapid and accurate work to be carried out with very few possibilities of error and which can be easily automated.

Summarizing, the following operations may for example be employed:

1. Spraying of plants with one spray liquor.

The plants (pots) are placed in the cabinet 16, the cabinet is closed, the liquor is filled into the reservoir, the plants are sprayed until no more liquor is drawn up by the injector nozzle, the agitator in the reservoir is switched on, mist and vapors are removed from the cabinet, the cabinet is opened, the plants (pots) in the cabinet are changed, the cabinet is closed, liquor is filled into the reservoir, if desired a different amount of liquor is set by the rack-and-pinion drive 13 or magnetic valve 12, and spraying is carried out again.

2. Spraying of plants with different spray liquors.

All steps as under 1 up to the opening of the cabinet. Then: the plants are removed from the cabinet, the empty cabinet is closed, the reservoir, injector nozzle, and the lines to the nozzle and cabinet are flushed, the flushing agent being sprayed into the cabinet through the injector nozzle and, if desired, through other nozzles 19, flushing is finished, air is blown into the reservoir, mist and vapors are removed from the cabinet, the cabinet is opened and plants (pots) are placed in the cabinet. The remaining steps are as described under 1.

3. Spraying of different plants with different amounts of the same spray liquor.

The steps are as described under 1. The spray liquor is drawn up through the suction tube at the shallowest immersion depth. The liquor is then stirred with the air stirrer, a switch is made to the suction tube at the medium immersion depth, different plants are sprayed with the second amount of liquor, the liquor is again stirred, a second switch is made to the suction tube immersed most deeply, and different plants are sprayed with the third amount of liquor.

No claim is made to those portions of the disclosure and drawings which are outside the scope of the claims.

The following examples demonstrate the results obtainable with the apparatus according to the invention.

EXAMPLE 1

The apparatus according to the invention (I) and, for comparison, conventional spraying equipment (II) were used to spray Sinapis alba plants with the same amount of first a plant regulator, then a contact herbicide, and finally a soil herbicide.

After a few days it was ascertained that, in the case of I, Sinapis alba showed the action typical for each agent, whereas in the case of II there was a clear carry-over.

The results are given below:

| Agent | I | II |
|---|---|---|
| Plant regulator | typical regulator action | typical regulator action |
| Contact herbicide | typical contact effect | contact effect with regulator action |
| Soil herbicide | withering effect from leaf periphery inward | withering effect from leaf periphery inward, together with slight contact action and regulator action |

EXAMPLE 2

100 substances were sprayed by one person with the apparatus according to the invention (I) and, for comparison, by one person with conventional equipment (II). A time comparison showed that the spraying operation and the cleaning of the apparatus in the case of I took far less time than spraying in the case of II, no account being taken of the time involved in cleaning the apparatus here.

I claim:

1. An apparatus for spraying plants with a liquid which is sucked up in a predetermined amount and is atomized by means of an air stream, said apparatus having a liquid reservoir equipped with a plurality of suction tubes extending into said reservoir, the lower ends of respective tubes being at different levels in said reservoir, and a fixed overflow in said reservoir at a level above the lower ends of said tubes.

2. An apparatus as claimed in claim 1 wherein the apparatus is equipped with lines for the supply and removal of flushing agent.

3. An apparatus as claimed in claim 1 wherein the reservoir is equipped with air injection agitation means.

4. An apparatus as claimed in claim 2 wherein one arm of the flushing agent supply line enters the lower portion of the reservoir and another arm communicates with a ring of nozzles arranged above the reservoir, said reservoir being open at the top.

5. An apparatus as claimed in claim 1 wherein the suction tubes are connected with an injector nozzle.

6. An apparatus as claimed in claim 2 wherein the lines for removal of the flushing agent are an outlet located in the bottom of the reservoir and said tubes connected to an injector nozzle.

7. An apparatus as claimed in claim 5 wherein magnetic valves are provided between the respective suction tubes arrangement and the injector nozzle.

8. An apparatus as claimed in claim 1 wherein the apparatus is used in conjunction with a spray cabinet.

9. An apparatus as claimed in claim 1 wherein the apparatus is used in conjunction with a vehicle.

* * * * *

PO-1050
(5/69)

UNITED STATES PATENT OFFICE
CERTIFICATE OF CORRECTION

Patent No. 3,749,319          Dated July 31, 1973

Inventor(s) Adolf Fischer

It is certified that error appears in the above-identified patent and that said Letters Patent are hereby corrected as shown below:

First page, left-hand column, fourth line, insert
-- [73] Assignee:    Badische Anilin- & Soda-Fabrik
                        Aktiengesellschaft, Ludwigshafen/Rhein,
                        Germany    --.

Signed and sealed this 27th day of November 1973.

(SEAL)
Attest:

EDWARD M. FLETCHER, JR.          RENE D. TEGTMEYER
Attesting Officer                  Acting Commissioner of Patents